(12) United States Patent
Keuthage et al.

(10) Patent No.: US 10,286,956 B2
(45) Date of Patent: May 14, 2019

(54) MOTOR VEHICLE

(71) Applicant: Bayerische Motoren Werke Aktiengesellschaft, Munich (DE)

(72) Inventors: Lennart Keuthage, Munich (DE); Robert Loch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/789,871

(22) Filed: Oct. 20, 2017

(65) Prior Publication Data

US 2018/0057062 A1   Mar. 1, 2018

Related U.S. Application Data

(63) Continuation of application No. PCT/EP2016/058388, filed on Apr. 15, 2016.

(30) Foreign Application Priority Data

Apr. 22, 2015   (DE) .......................... 10 2015 207 376

(51) Int. Cl.
*B62D 21/15*     (2006.01)
*B62D 25/02*     (2006.01)
*B62D 29/04*     (2006.01)

(52) U.S. Cl.
CPC ......... *B62D 21/157* (2013.01); *B62D 25/025* (2013.01); *B62D 29/043* (2013.01)

(58) Field of Classification Search
CPC ... B62D 21/157; B62D 25/025; B62D 29/043
(Continued)

(56) References Cited

U.S. PATENT DOCUMENTS 3,596,979 A * 8/1971 Hablitzel ............. B62D 29/046
                                                          296/181.2
4,440,434 A * 4/1984 Celli ................... B62D 29/001
                                                          296/181.2
(Continued)

FOREIGN PATENT DOCUMENTS

CN          202827793 U    3/2013
DE     10 2007 033 570 A1  1/2009
(Continued)

OTHER PUBLICATIONS

PCT/EP2016/058388, International Search Report dated Jun. 23, 2016 (Three (3) pages).
(Continued)

*Primary Examiner* — Joseph D. Pape
(74) *Attorney, Agent, or Firm* — Crowell & Moring LLP

(57) ABSTRACT

An impact protection element for a vehicle is disclosed. The impact protection element includes a side sill composed of fiber-reinforced plastic, where the side sill is formed as a hollow profiled element and includes an outer wall element, which forms an impact surface, and an inner wall element, which lies opposite the outer wall element and can be connected to a vehicle structure. A reinforcing element composed of fiber-reinforced plastic is disposed in the side sill and includes at least one flat connecting surface which connects the outer wall element to the inner wall element and is oriented substantially parallel to the XY plane of the vehicle.

9 Claims, 5 Drawing Sheets

(58) Field of Classification Search
USPC .......................................................... 296/209
See application file for complete search history.

(56) References Cited

U.S. PATENT DOCUMENTS

| | | |
|---|---|---|
| 2012/0074735 A1 | 3/2012 | Engertsberger et al. |
| 2015/0158532 A1* | 6/2015 | Ayuzawa ........... B62D 25/2009 |
| | | 296/193.07 |

FOREIGN PATENT DOCUMENTS

| | | |
|---|---|---|
| DE | 10 2010 003 497 A1 | 10/2011 |
| DE | 10 2010 030 535 A1 | 11/2011 |
| DE | 10 2011 101533 A1 | 12/2011 |
| DE | 10 2012 206 032 A1 | 10/2013 |
| DE | 10 2012 024836 A1 | 6/2014 |
| DE | 10 2013 002 537 A1 | 8/2014 |
| EP | 2 371 677 A1 | 10/2011 |
| JP | 2013 126811 A | 6/2013 |
| JP | 2015 063207 A | 4/2015 |
| WO | WO 2014/069108 A1 | 5/2014 |

OTHER PUBLICATIONS

German Search Report of corresponding DE patent application 10 2015 207 376.9 w/English translation of Explanations for Section C dated Jan. 18, 2016 (Eight (8) pages).
Chinese Notification of the First Office Action issued in Chinese counterpart application No. 201680022977.0 dated Feb. 19, 2019 (Twelve (12) pages).

* cited by examiner

MOTOR VEHICLE

CROSS REFERENCE TO RELATED APPLICATIONS

This application is a continuation of PCT International Application No. PCT/EP2016/058388, filed Apr. 15, 2016, which claims priority under 35 U.S.C. § 119 from German Patent Application No. 10 2015 207 376.9, filed Apr. 22, 2015, the entire disclosures of which are herein expressly incorporated by reference.

BACKGROUND AND SUMMARY OF THE INVENTION

The invention relates to an impact protection element for a vehicle.

Side sills are known as impact protection elements for vehicles.

Their crash capability is determined by crash tests. Euro NCAP (European New Car Assessment Programme) is an organization which carries out crash tests on new types of car and then determines the safety of the vehicles. Pole side impact is part of the Euro NCAP crash test. In this case, for example, the impact of the side of the vehicle with a tree or post is simulated by the vehicle being catapulted at 29 km/h against a stable pole. This crash test is a standard requirement in the U.S. The following is defined as a pole impact in the FMVSS214 loading case: the vehicle moves on a slide laterally in the direction of the pole (rigid composed of steel); the slide is braked and the vehicle slips further against the pole; the impact speed of the vehicle against the pole is 32 km/h. Possible injuries to the vehicle occupant in the head, upper body and lower body region following the crash are detected with aid of a dummy.

Up to now, the floor assembly of the vehicle and of the side sills has been constructed in metal. There is a clear separation of components and function between the side sill and floor assembly. Energy is absorbed by means of buckling in the seat cross member and in the floor assembly, and also by means of bending in the side sill. The load is distributed extensively, and the resulting bending load of the side sill opposes the intrusion.

It is the object of the invention to further reduce the intrusion and to provide a lighter weight side sill having increased rigidity.

According to the invention, this object is achieved by an impact protection element for a vehicle having a side sill composed of fiber-reinforced plastic, where the side sill is formed as a hollow profile, an outer wall element which forms an impact surface, an inner wall element which lies opposite the outer wall element and is connectable to a vehicle structure, a reinforcing element composed of fiber-reinforced plastic, where the reinforcing element is accommodated in the side sill, and at least one flat connecting surface which connects the outer wall element to the inner wall element and is oriented substantially parallel to the XY plane of the vehicle.

The use of fiber-reinforced plastic, in particular carbon-fiber-reinforced plastic (CFRP), ensures a low weight of the impact protection element according to the invention. The advantage here is that a CFRP part which can absorb just as much energy as a metal part weighs only approximately one half to one third. The vehicle thus becomes lighter in weight and consumes less fuel.

Furthermore, it is ensured by the substantially parallel alignment of the reinforcing element with the XY plane of the vehicle that the flat connecting surface is oriented substantially orthogonally to the crash test pole or a tree/post which extends parallel to the Z direction of the vehicle. Energy is then absorbed by destruction of the flat connecting surface. This alignment is particularly advantageous in order to absorb energy. Furthermore, the pole/tree/post, etc., always strikes substantially orthogonally against the flat connecting surface, and therefore the advantageous energy absorption behavior of the reinforcing element is always ensured. The intrusion is significantly reduced as a result. While known impact protection elements composed of metals have an intrusion of 250-350 mm under test conditions, an impact protection element according to the invention can have an intrusion of just 150-250 mm.

Furthermore, the connecting surface aligned according to the invention increases the rigidity of the side sill. Other loads apart from the crash loads can therefore also be supported. In summary, an integration of components and an integration of functions are therefore ensured.

In a preferred embodiment, the reinforcing element extends substantially over the length of the side sill. The side sill thereby provides the particularly advantageous energy absorption behavior over its entire length.

According to a further embodiment, the reinforcing element is formed integrally with the outer wall element or the inner wall element. The outer wall element can be formed integrally here with the connecting surface, the inner wall element can be formed integrally with the connecting surface, or the outer and inner wall element can be formed integrally with the connecting surface. The integral construction enables the impact protection element according to the invention to be produced cost-effectively. For example, a pultrusion method for producing the impact protection element is preferred.

According to another embodiment, the reinforcing element and the side sill are formed separately. In this case, the reinforcing element is attached to the outer wall element and to the inner wall element and connects the wall elements to each other in this manner. This modular or differential construction permits greater flexibility in production. For example, the same side sills can be provided with different reinforcing elements which meet different requirements.

In a particularly preferred embodiment, the outer wall element and the inner wall element are formed separately here and include flanges for connecting the inner wall element and the outer wall element. The flexibility in production can thereby be further increased. For example, the same outer wall element can be connected to different inner wall elements which are connectable to different vehicle structures.

In one embodiment, the reinforcing element is designed as a hat profile which includes two flat connecting surfaces, an outer planar attachment element and two inner attachment surfaces. By means of the planar attachment of the reinforcing element on the side sill, the rigidity of the latter is increased further. Furthermore, the energy absorption is increased by the two flat connecting surfaces.

In this embodiment, it is advantageous that the reinforcing element is formed integrally. The reinforcing element can thereby be provided in a simple and cost-effective manner.

However, it is also advantageous that the first connecting surface, a first outer attachment surface and the first inner attachment surface are formed integrally; and the second connecting surface, a second outer attachment surface and the second inner attachment surface are formed integrally. The first outer attachment surface is connected here to the second outer attachment surface in an overlapping manner in order to form the outer planar attachment element. The flexibility in production can thereby be further increased.

In another embodiment, the reinforcing element is designed as a box profile which includes two flat connecting surfaces, an outer planar attachment element and an inner planar attachment element. By means of the planar attachment of the reinforcing element on the side sill, the rigidity of the latter is increased further. Furthermore, the energy absorption is increased by the two flat connecting surfaces.

In a preferred embodiment, the impact protection element furthermore includes a honeycomb structure composed of a fiber-reinforced plastic, which honeycomb structure is accommodated in the side cell, in particular in a cavity formed by the reinforcing profile. The energy absorption can thereby be further increased.

The invention also includes a vehicle with an impact protection element according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
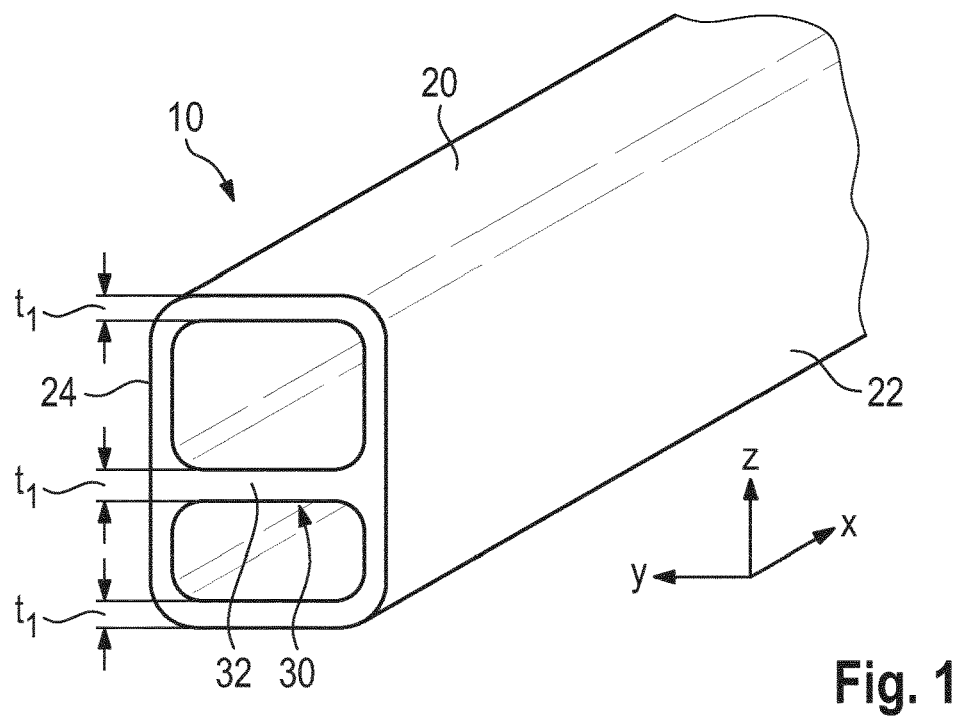
FIG. 1 shows an exemplary embodiment of the impact protection element according to the invention in a perspective side view.

FIG. 1 shows an exemplary embodiment of an impact protection element 10 according to the invention which includes a side sill 20. The side sill 20 is formed as a hollow profile composed of fiber-reinforced plastic, in particular CFRP. The rectangular hollow profile in FIG. 1 is shown only as an example; other hollow profile shapes are also conceivable. The side sill 20 has an outer wall element 22 which forms an impact surface, for example, for the pole test. Furthermore, the side sill 20 has an inner wall element 24 which lies opposite the wall element 22 and which is connectable to a vehicle structure, in particular a floor structure 40 of the vehicle. For example, the inner wall element 24 can be adhesively bonded to the floor structure 40.

The outer wall element 22 is connected to the inner wall element 24 by a reinforcing element 30 composed of fiber-reinforced plastic, in particular CFRP. The reinforcing element 30 is accommodated in the side sill 20 and is formed by a flat connecting surface 32 having a wall thickness t1 which is aligned substantially parallel to the XY plane of the vehicle. The alignment substantially parallel to the XY plane of the vehicle comprises angles of up to +/−10° to the XY plane of the vehicle.

In FIG. 1, the outer wall element 22, the inner wall element 24 and the connecting surface 32 are formed integrally. Furthermore, the connecting surface 32 extends over the entire length of the side sill 20. As a result, the impact protection element 10 has two chambers. A preferred production method is a pultrusion method.

According to the invention, energy is absorbed during the crash by, inter alia, destruction of the connecting surface 32. Furthermore, the connecting surface 32 contributes to the rigidity of the sill 20.

Figure 2:
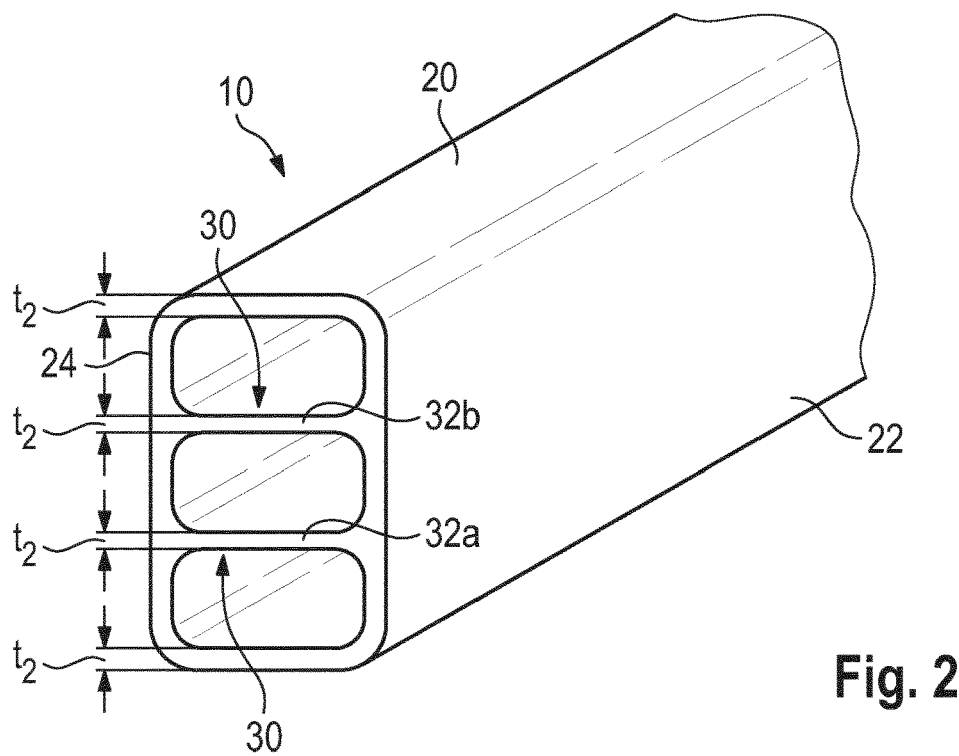
FIG. 2 shows a further exemplary embodiment of the impact protection element according to the invention in a perspective side view.

The wall thickness t (quantity of fiber) of the connecting surface 32 is proportional to the energy to be absorbed. The more connecting surfaces 32 the impact protection element 10 has, the smaller the wall thickness t (quantity of fiber) of the individual connecting surfaces 32. FIG. 2 shows a further exemplary embodiment similar to FIG. 1 with two connecting surfaces 32a and 32b which are of a smaller wall thickness $t_2$ than in FIG. 1 ($t_1 > t_2$).

Furthermore, an embodiment with more than two connecting surfaces is also conceivable; accordingly, the number of chambers in the impact protection element 10 increases. In addition, it is also conceivable for all of the embodiments which are described that the wall thicknesses within an impact protection element 10 differ (not shown).

Figure 3A:
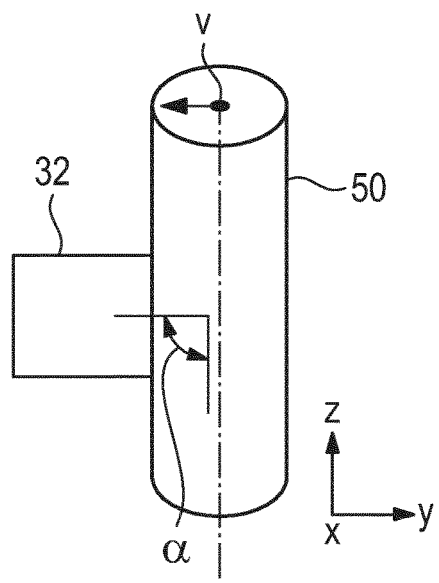
FIGS. 3a, 3b, and 3c show the alignment according to the invention of the flat connecting surface from different views.
Figure 3B:
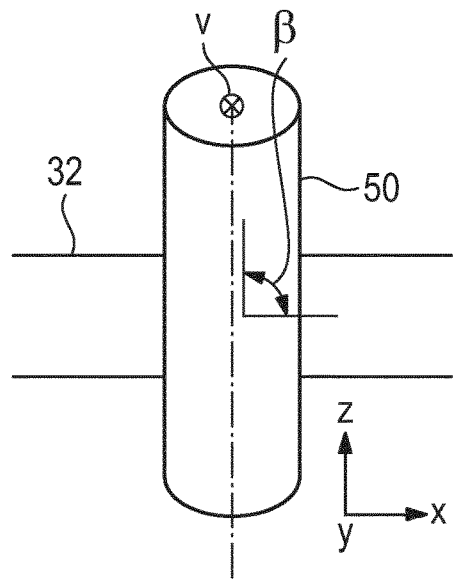
Figure 3C:
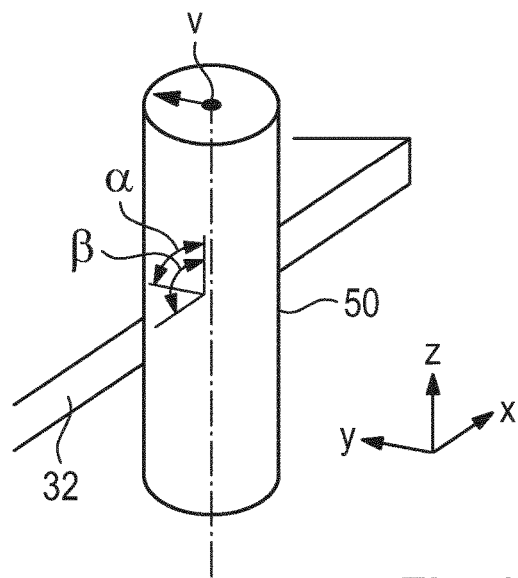

FIGS. 3a to 3c show the alignment according to the invention of the connecting surface 32 with a pole 50 from different views. It is assumed here that the impact protection element 10 is attached to one side of the vehicle and extends along the X direction of the vehicle. FIG. 3a shows a partial sectional view of the connecting surface 32 along the X direction of the vehicle. The vehicle moves along its Y direction toward the pole 50. By means of the substantially parallel alignment of the connecting surface 32 to the XY plane of the vehicle, an angle α=90°±10° arises according to the invention between connecting surface 32 and post 50. FIG. 3b shows a partial sectional view of the connecting surface 32 along the Y direction of the vehicle. By means of the substantially parallel alignment of the connecting surface 32 to the XY plane of the vehicle, an angle β=90°±10° arises according to the invention between connecting surface 32 and post 50. FIG. 3c shows a perspective view with the angles α and β.

Figure 4:
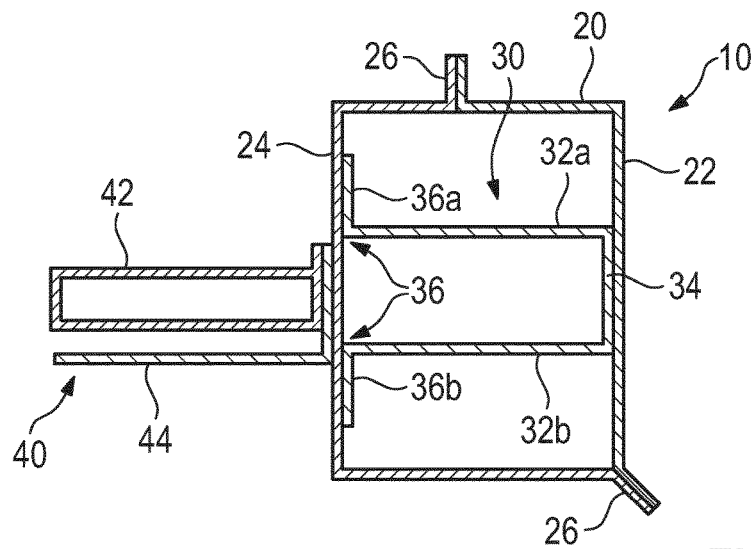
FIG. 4 shows another exemplary embodiment of the impact protection element according to the invention in a sectional view in which the impact protection element is attached to a floor structure of a vehicle.

FIG. 4 shows a further exemplary embodiment of the impact protection element 10 according to the invention. The reinforcing element 30 is designed here as a separate hat profile and is connected in a planar manner to the sill 20. The reinforcing element 30 includes two connecting surfaces 32a and 32b here. On the connecting surfaces 32a and 32b, the reinforcing element 30 has an outer planar attachment element 34 which is connected in a planar manner to the outer wall 22. Furthermore, the reinforcing element 30 has an inner planar attachment element 36 which is formed by two inner attachment surfaces 36a and 36b. The two inner attachment surfaces 36a and 36b are respectively provided on the connecting surfaces 32a and 32b and are connected in a planar manner to the inner wall 24. It is conceivable here for the reinforcing element 30 to be formed integrally.

Furthermore, it is also conceivable for the reinforcing element 30 to be designed as a separate profile with only one connecting surface 32 (not shown). On the connecting surface 32, the reinforcing element 30 here has an outer planar attachment element 34 which is connected in a planar manner to the outer wall 22. Furthermore, on the connecting surface 32, the reinforcing element 30 has an inner planar attachment element 36 which is connected in a planar manner to the inner wall 24.

Figure 5:
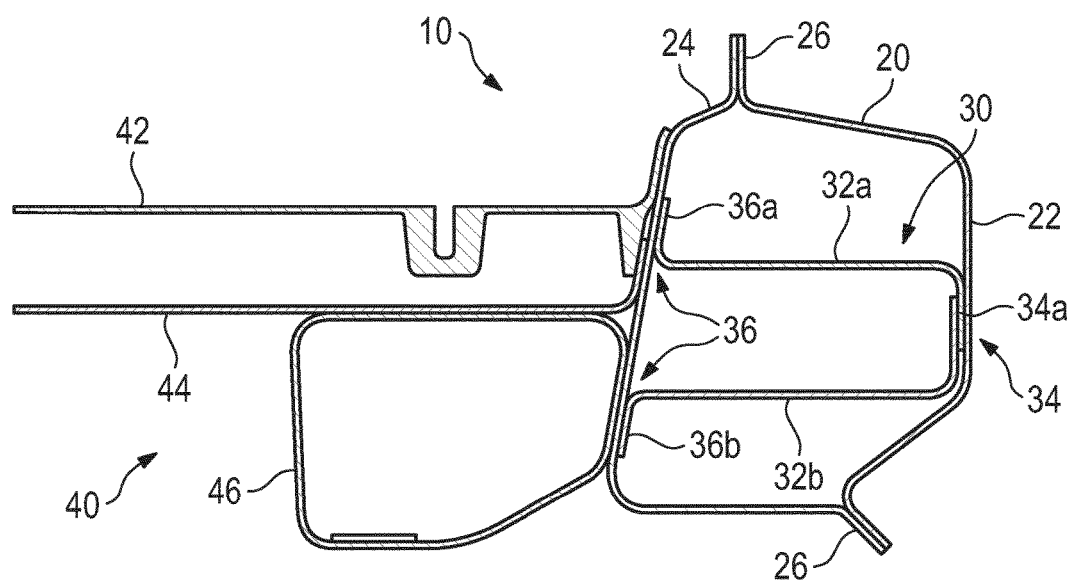
FIG. 5 shows a further exemplary embodiment of the impact support element according to the invention in a sectional view.
Figure 6:
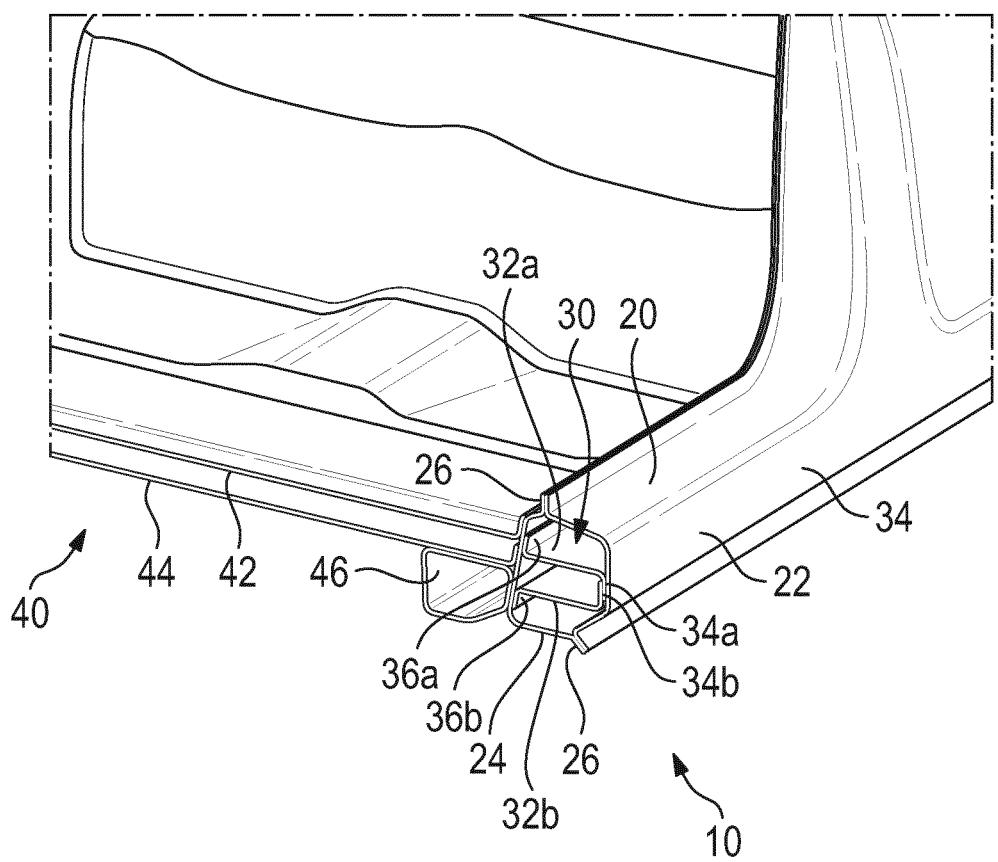
FIG. 6 shows a perspective view of the exemplary embodiment of FIG. 5.

FIGS. 5 and 6 show an exemplary embodiment of the impact protection element 10 according to the invention similarly to FIG. 4, where the reinforcing element 30 is formed in two parts: in this case, the first connecting surface 32a, a first outer attachment surface 34a and the first inner attachment surface 36a are formed integrally. Furthermore, the second connecting surface 32b, a second outer attachment surface 34b and the second inner attachment surface 36b are formed integrally. This can be seen in FIG. 6, for example, where the first outer attachment surface 34a is connected to the second outer attachment surface 34b in an overlapping manner in order to form the outer planar attachment element 34.

Figure 7:
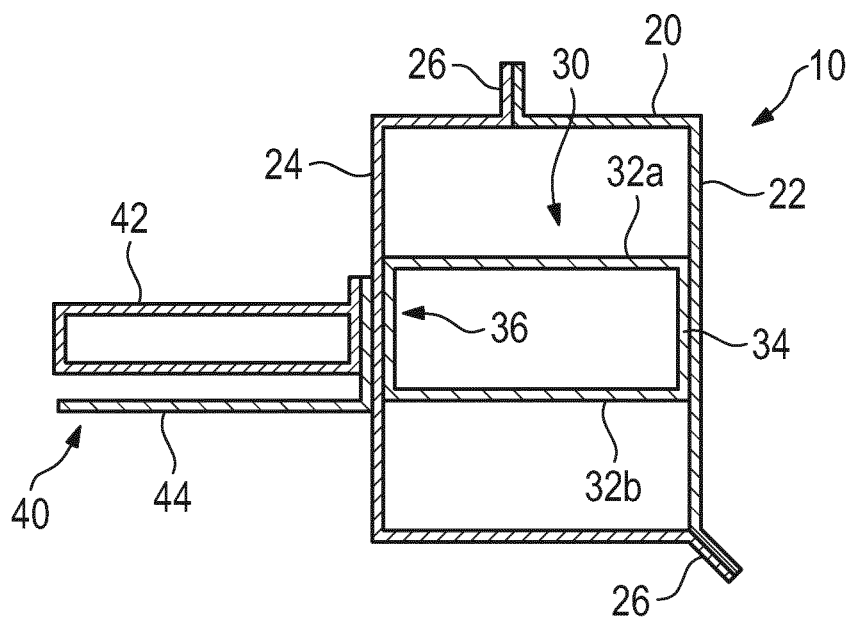
FIG. 7 shows a further exemplary embodiment of the impact protection element according to the invention in a sectional view in which the impact protection element is attached to a floor structure of a vehicle.

FIG. 7 shows a further exemplary embodiment of the impact protection element 10 according to the invention, where the reinforcing element 30 is designed as a box profile. The box profile is formed by the two connecting surfaces 32a and 32b, the outer planar attachment element 34 and the inner planar attachment element 36. The outer planar attachment element 34 is connected in a planar manner to the outer wall 22. The inner planar attachment element 36 is connected in a planar manner to the inner wall 24. The reinforcing element 30 here can be formed integrally or in multiple parts as a box profile.

Figure 8:
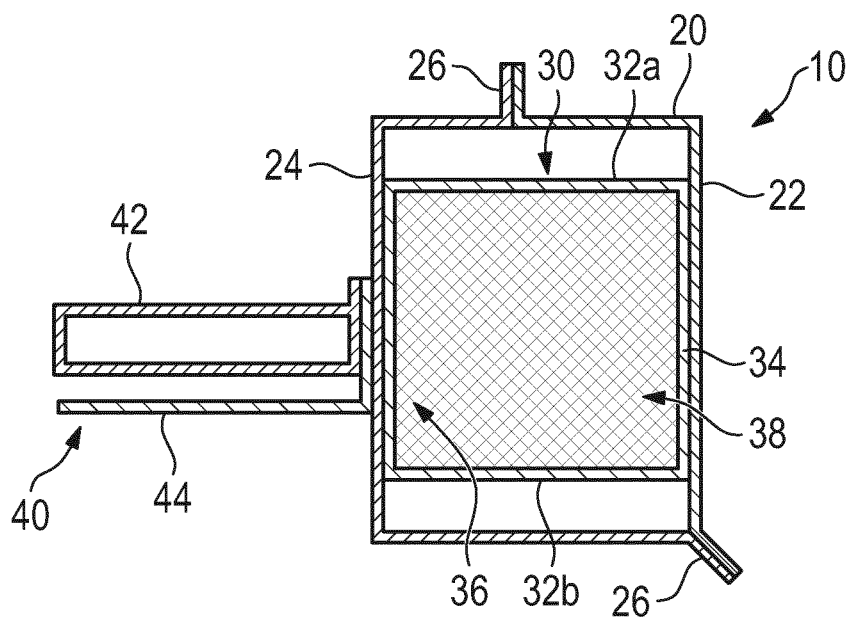
FIG. 8 shows a further exemplary embodiment of the impact protection element according to the invention in a sectional view in which the impact protection element is attached to a floor structure of a vehicle and has a honeycomb structure.

FIG. 8 shows an exemplary embodiment similar to FIG. 7 in which a honeycomb structure 38 composed of a fiber-reinforced plastic is accommodated in the reinforcing element 30 formed as a box profile. It is furthermore conceivable for honeycomb structures to be accommodated in all cavities of the impact protection element 10 according to the invention. For example, a honeycomb structure can also be arranged in the cavity between side sill 20 and connecting surface 32.

It can be seen in general in FIGS. 4-8 that the inner wall element 24 is connected to a floor structure 40. The floor structure 40 can be formed, for example, by a seat cross member 42, a floor shell 44 and/or a support 46. Furthermore, it can be seen in these Figures that the side sill 20 can also be formed in two parts. In this case, the outer wall element 22 and the inner wall element 24 are connected to the flanges 26. However, it is also conceivable for the side sill to be formed integrally.

Furthermore, in all of the embodiments of FIGS. 2 and 4-8, the reinforcing element 30 of the impact protection element 10 according to the invention can also include more than the two connecting surfaces 32.

In summary, the impact protection element 10 according to the invention has the following advantages: the specific energy absorption potential of FRP (fiber reinforced plastic, e.g., CFRP (carbon-fiber-reinforced plastic) GFRP (glass-fiber-reinforced plastic)) is a material property which, under a compressive load, provides a statement regarding the energy absorption per kg of material. FRP can absorb approximately 2-3 times more energy under a compressive load than metals. This specific energy absorption potential of FRP is used in the variants presented. Smaller intrusions and a lower component weight are thereby made possible. The intrusion of the post into the side of the vehicle under typical test conditions is only approximately 150-250 mm. By means of the lower intrusion in comparison to the steel construction, first of all, important components, such as the high-voltage accumulator under the vehicle floor, can be protected. Secondly, a greater air bag deployment space remains level with the occupant, which improves the occupant protection. In comparison to previous FRP concepts, the cost saving potential by means of the integral construction is higher. At the same time, the invention permits use of composite fiber materials in the floor region without problems caused by thermal stresses occurring. Thermal stresses can arise, for example, in a mixed composite metal/fiber material construction.

LIST OF REFERENCE NUMBERS

10 Impact protection element
20 Side sill
22 Outer wall element
24 Inner wall element
26 Flange
30 Reinforcing element
32 Flat connecting surface
34 Outer planar attachment element
34a First outer attachment surface
34b Second outer attachment surface
36 Inner planar attachment element
36a First inner attachment surface
36b Second inner attachment surface
38 Honeycomb structure
40 Floor structure
42 Seat cross member
44 Floor shell
46 Support of the floor structure
50 Post The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. An impact protection element for a vehicle, comprising:
   a side sill composed of fiber-reinforced plastic, wherein the side sill is formed as a hollow profile and includes:
      an outer wall element as an impact surface; and
      an inner wall element, wherein the inner wall element is disposed opposite the outer wall element and is connectable to a vehicle structure;
   a reinforcing element composed of fiber-reinforced plastic, wherein the reinforcing element is disposed in the side sill and includes at least one flat connecting surface, wherein the at least one flat connecting surface connects the outer wall element to the inner wall element and is oriented substantially parallel to an XY plane of the vehicle, wherein the reinforcing element extends substantially over a length of the side sill, and wherein the reinforcing element is formed integrally with the outer wall element or the inner wall element.
2. An impact protection element for a vehicle, comprising:
   a side sill composed of fiber-reinforced plastic, wherein the side sill is formed as a hollow profile and includes:
      an outer wall element as an impact surface; and an inner wall element, wherein the inner wall element is disposed opposite the outer wall element and is connectable to a vehicle structure;

a reinforcing element composed of fiber-reinforced plastic, wherein the reinforcing element is disposed in the side sill and includes at least one flat connecting surface and wherein the at least one flat connecting surface connects the outer wall element to the inner wall element and is oriented substantially parallel to an XY plane of the vehicle;

wherein the reinforcing element and the side sill are separate components and wherein the reinforcing element is attached to the outer wall element and to the inner wall element;

wherein the outer wall element and the inner wall element are separate components and include respective flanges for connecting the inner wall element and the outer wall element.

3. The impact protection element as claimed in claim 2, wherein the reinforcing element has a hat profile and includes two flat connecting surfaces, an outer planar attachment element, and two inner attachment surfaces.

4. The impact protection element as claimed in claim 3, wherein the two flat connecting surfaces, the outer planar attachment element, and the two inner attachment surfaces are formed integrally.

5. An impact protection element for a vehicle, comprising:
a side sill composed of fiber-reinforced plastic, wherein the side sill is formed as a hollow profile and includes:
an outer wall element as an impact surface; and
an inner wall element, wherein the inner wall element is disposed opposite the outer wall element and is connectable to a vehicle structure;
a reinforcing element composed of fiber-reinforced plastic, wherein the reinforcing element is disposed in the side sill and includes at least one flat connecting surface and wherein the at least one flat connecting surface connects the outer wall element to the inner wall element and is oriented substantially parallel to an XY plane of the vehicle;
wherein the reinforcing element includes:
a first flat connecting surface, a first outer attachment surface, and a first inner attachment surface formed integrally; and
a second flat connecting surface, a second outer attachment surface, and a second inner attachment surface formed integrally;
wherein the first outer attachment surface overlaps and is connected to the second outer attachment surface to form an outer planar attachment element.

6. The impact protection element as claimed in claim 2, wherein the reinforcing element has a box profile and includes two flat connecting surfaces, an outer planar attachment element, and an inner planar attachment element.

7. An impact protection element for a vehicle, comprising:
a side sill composed of fiber-reinforced plastic, wherein the side sill is formed as a hollow profile and includes:
an outer wall element as an impact surface; and
an inner wall element, wherein the inner wall element is disposed opposite the outer wall element and is connectable to a vehicle structure;
a reinforcing element composed of fiber-reinforced plastic, wherein the reinforcing element is disposed in the side sill and includes at least one flat connecting surface and wherein the at least one flat connecting surface connects the outer wall element to the inner wall element and is oriented substantially parallel to an XY plane of the vehicle; and
a honeycomb structure composed of a fiber-reinforced plastic, wherein the honeycomb structure is disposed in the side sill.

8. The impact protection element as claimed in claim 7, wherein the honeycomb structure is disposed in a cavity defined by the reinforcing element.

9. A vehicle comprising an impact protection element as claimed in claim 1.

* * * * *